United States Patent
Chow et al.

(10) Patent No.: US 8,458,179 B2
(45) Date of Patent: Jun. 4, 2013

(54) AUGMENTING PRIVACY POLICIES WITH INFERENCE DETECTION

(75) Inventors: Richard Chow, Sunnyvale, CA (US); Phillippe J. P. Golle, San Francisco, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 987 days.

(21) Appl. No.: 11/947,292

(22) Filed: Nov. 29, 2007

(65) Prior Publication Data

US 2009/0144255 A1  Jun. 4, 2009

(51) Int. Cl.
- *G06F 7/00* (2006.01)
- *G06F 17/30* (2006.01)
- *G06F 12/00* (2006.01)

(52) U.S. Cl.
USPC ............ 707/737; 707/754; 707/765; 707/783

(58) Field of Classification Search
USPC ........... 707/999.001–999.005, 999.01, 999.1, 707/737, 754
See application file for complete search history.

(56) References Cited

U.S. PATENT DOCUMENTS

| | | | | |
|---|---|---|---|---|
| 5,864,846 A * | 1/1999 | Voorhees et al. | ...... | 707/999.002 |
| 6,038,561 A * | 3/2000 | Snyder et al. | ......... | 707/999.002 |
| 6,167,397 A * | 12/2000 | Jacobson et al. | ....... | 707/999.005 |
| 6,470,307 B1 * | 10/2002 | Turney | .................. | 707/E17.058 |
| 7,617,176 B2 * | 11/2009 | Zeng et al. | ............. | 707/999.001 |
| 2003/0225773 A1 * | 12/2003 | Jenssen et al. | ................ | 707/100 |
| 2004/0019601 A1 * | 1/2004 | Gates | ............................ | 707/102 |
| 2005/0234879 A1 * | 10/2005 | Zeng et al. | ........................ | 707/3 |
| 2007/0143176 A1 * | 6/2007 | Nong et al. | ..................... | 705/14 |
| 2008/0005051 A1 * | 1/2008 | Turner et al. | .................... | 706/20 |
| 2008/0010274 A1 * | 1/2008 | Carus et al. | ....................... | 707/5 |
| 2008/0104021 A1 * | 5/2008 | Cai et al. | .......................... | 707/3 |
| 2008/0294621 A1 * | 11/2008 | Kanigsberg et al. | ............. | 707/5 |
| 2008/0319973 A1 * | 12/2008 | Thambiratnam et al. | ......... | 707/5 |

* cited by examiner

*Primary Examiner* — Kannan Shanmugasundaram

(74) *Attorney, Agent, or Firm* — Shun Yao; Park, Vaughan, Fleming & Dowler LLP

(57) ABSTRACT

A system is provided for augmenting a privacy policy. During operation, the system obtains a set of training documents and at least one seed keyword associated with the privacy policy. The system extracts a number of candidate keywords from the training documents and formulates at least one query based on the candidate keywords. The system then issues the query to a corpus. In response to the query, the system receives a set of result documents. The system further determines whether a respective keyword extracted from the result documents matches at least one seed keyword. The system then augments the privacy policy by associating the candidate keyword corresponding to the respective keyword with the privacy policy based on the determination. In addition, the system applies the augmented privacy policy to a subject document and produces a result to indicate whether the subject document is in violation of the privacy policy.

18 Claims, 3 Drawing Sheets

AUGMENTING PRIVACY POLICIES WITH INFERENCE DETECTION

RELATED APPLICATIONS

The instant application is related to U.S. patent application Ser. No. 11/729,576, entitled "Method and System for Detecting Undesired Inferences from Documents," filed 28 Mar. 2007; and U.S. patent application Ser. No. 11/957,833, entitled "Outbound Content Filtering via Automated Inference Detection," filed Dec. 17, 2007; and U.S. patent application Ser. No. 11/951,198, entitled "Inbound Content Filtering via Automated Inference Detection," filed Dec. 5, 2007; which are incorporated by reference herein.

FIELD OF THE INVENTION

The present invention relates to the design of intelligent data processing. More specifically, the present invention relates to a method and system for augmenting privacy policies with inference detection.

RELATED ART

The relentless growth of the Internet has made the World-Wide Web (the Web) one of the largest and most accessible pool of information today. However, managing the security and privacy of electronic documents has never been more challenging. Today, information can be transmitted and stored electronically in a plethora of formats, such as files stored on a networked storage device, email sent and received by an email client program, or documents hosted on a Web server. These online resources make protecting information privacy much more difficult.

Conventional privacy policies typically specify the characteristics of documents to be protected. For example, a privacy policy may specify a file name, a few key words, and/or a file type or category of the sensitive document. It is very difficult, if not impossible, to accurately extract and exhaustively enumerate all the sensitive keywords for a system to look for when determining whether a document, or any form of electronic information, is subject to privacy protection. Hence, different contexts and languages used to describe the subject matter in a document can cause ambiguity, mask the sensitive content, and allow the document to escape the privacy protection.

SUMMARY

One embodiment of the present invention provides a system that augments a privacy policy. During operation, the system obtains a set of training documents and at least one seed keyword associated with the privacy policy. The system extracts a number of candidate keywords from the training documents and formulates at least one query based on the candidate keywords. The system then issues the query to a corpus. In response to the query, the system receives a set of result documents. The system further determines whether a respective keyword extracted from the result documents matches at least one seed keyword. The system then augments the privacy policy by associating the candidate keyword corresponding to the respective keyword with the privacy policy based on the determination. In addition, the system applies the augmented privacy policy to a subject document and produces a result to indicate whether the subject document triggers the privacy policy.

In variation on this embodiment, the system extracts the keywords from the result documents by determining a term-frequency inverse-document-frequency (TF.IDF) weight for a respective word or phrase contained in a respective result document.

In a variation on this embodiment, applying the augmented privacy policy to the subject document involves searching the subject document for occurrences of any of the candidate keywords associated with the privacy policy.

In a variation on this embodiment, the system evaluates the strength of inference between a candidate keyword and a respective seed keyword and uses the evaluated strength in determining whether the candidate keyword matches at least one seed keyword.

In a further variation, evaluating the strength of inference between the candidate keyword and the seed keyword involves evaluating a ratio between the number of search hits from a query containing both the candidate keyword and the seed keyword, and the number of search hits from a query containing only the candidate keyword.

In a variation on this embodiment, obtaining the seed keywords involves issuing a query based on a sensitive topic to the corpus and extracting the seed keywords from a number of documents returned in response to the query.

In a variation on this embodiment, obtaining the training documents involves issuing a query based on a sensitive topic to the corpus and retrieving a predetermined number of highest ranked documents returned in response to the query.

DETAILED DESCRIPTION

Figure 1:
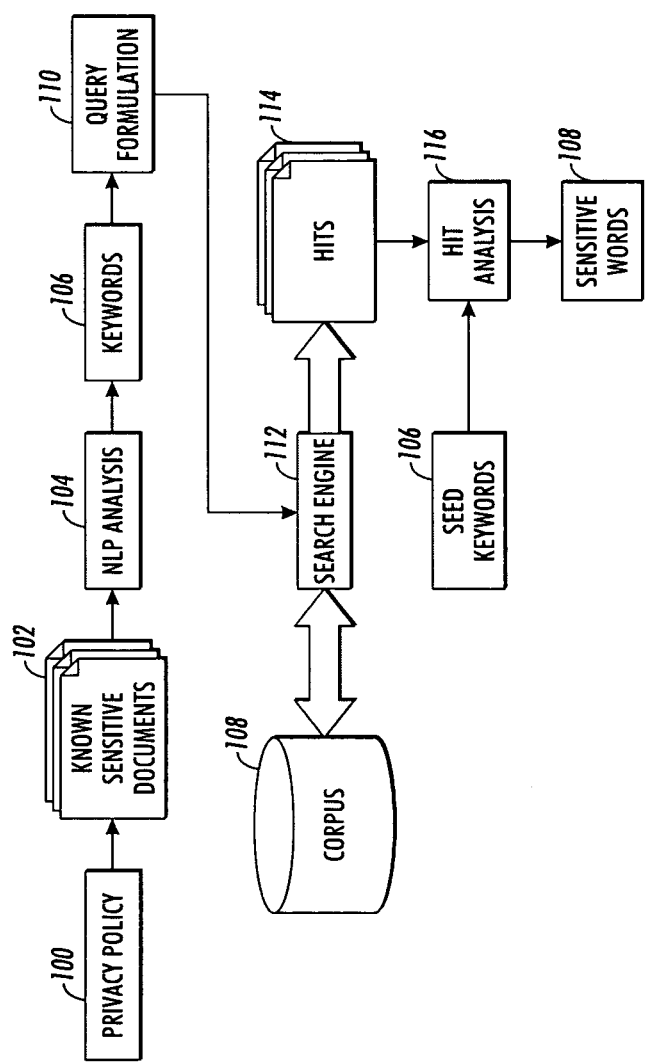
FIG. 1 illustrates an exemplary block diagram for a system that augments privacy policies in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

In general, an organization has a set of privacy policies by which a policy-enforcement system monitors and controls the access to or sharing of a set of information. For example, a company may have a policy of not allowing documents related to a particular product to be shared by anyone outside the company or anyone outside a particular group. A privacy policy may also be used to screen and block communications which contain sensitive information. For example, the company may preclude any files related to a product from being transmitted outside the company or being saved on a publicly accessible network drive.

The task of identifying whether a document contains sensitive information that triggers the privacy policy can be very challenging. Typically, the policy-enforcement system can search files, text messages, email communications, etc., for certain keywords, file names, or file types. However, it is unlikely that, at the time when the privacy policy is constructed, the policy designer can exhaustively specify all the keywords that pertain to the sensitive subject matter. The initial "bare-bones" privacy policy may only contain a few keywords that are related to the sensitive subject matter. As a result, when some documents or communications do not contain any of these initially specified keywords, but contain other language which can be used to identify or derive the sensitive subject matter, these documents or communications would escape the privacy policy.

For instance, suppose that an organization wishes to monitor or screen any text documents that pertain to Osama Bin Laden. Initially, the privacy policy specifies that any documents or communications containing directly identifying information, e.g., words such as "Osama," "Bin," "Laden," and "OBL," would trigger the privacy policy. However, even when a document does not contain any directly identifying word, it can still be recognized as pertaining to Osama Bin Laden, but would not be caught by the privacy-policy enforcement system. For example, a document containing the language "the son of a Saudi construction magnate who came from Yemen" can easily allow a reader to infer that the subject matter of this sentence is Osama Bin Laden, because a search with the query "Saudi construction magnate Yemen" returns numerous hits about Osama Bin Laden. Nevertheless, the policy-enforcement system would not be able to catch a document containing only this sentence but none of the directly identifying words.

Embodiments of the present invention provide a mechanism for augmenting a privacy policy with inference detection, wherein the system identifies and associates additional keywords with the privacy policy. As a result, accuracy and strength of the privacy policy can be significantly improved. In one embodiment, the system receives a set of training documents, which are known to pertain to the sensitive subject matter. The system then performs analysis on the training documents, extracts a number of keywords, and constructs search queries based on these keywords. The system further issues the queries to a corpus, which can be any collection of documents, such as the Web. In response, the system receives a number of hits. Subsequently, the system analyzes these hits and extracts a list of keywords. These keywords are then compared with certain seed keywords provided by the privacy-policy designer. If there is a match, the corresponding keyword in the training document is then associated with the privacy policy and can be used in the future to determine whether a subject document contains the sensitive information.

In this disclosure, "corpus" refers to a collection of documents. In one embodiment, a corpus can include all the documents available on the Web. The corpus can also be a set of documents internal to an organization, such as product manuals, email communications, files stored on a file server, etc. Additionally, the system can operate based on one or more corpora. "Documents" are understood here to be any form of content, including textual documents, spreadsheets, presentations, images, video, audio, multimedia, and so forth. Furthermore, a document can be paper-based or electronic.

Privacy-Policy Augmentation Based on Inference Detection

The following description presents an exemplary operation model of a privacy-policy augmentation tool based on inference detection. This model is not restrictive and is only for illustration purposes. Furthermore, there can be various ways to implement this model. For example, embodiments of the present invention can be implemented in a computer system, or over a collection of networked computers, such as a server farm, a cluster of computers, or a distributed computing collaboration. Different embodiments can also be implemented in hardware and/or software. A mathematical description of the problem is presented as follows.

Let C denote one or more documents considered for privacy-policy enforcement, and let R denote a corpus or a collection of corpora. Note that a corpus is a collection of reference documents. For example, collection C can include one or more documents stored on a company's intranet, and collection R can include all the documents publicly available on the Web.

Let K(C) denote all the knowledge that can be computed from private collection C. The set K(C represents all the statements and facts that can be derived from the information contained in collection C. Theoretically, the set K(C) can be computed with a complete and sound theorem prover given all the axioms in C. In practice, however, the costs for such computation can be prohibitively high. Therefore, one embodiment of the present invention uses an approximate representation of K(C), which can be a list of words contained in C. Similarly, let K(R) denote all the knowledge that can be computed from the reference collection R.

Undesired inferences (which could subject the document to a privacy policy but cannot be captured by the policy) can arise when the knowledge that can be extracted from the union of the private and reference collections, K(C∪R), is greater than the union of the knowledge that can be extracted separately from C and R, K(C∪K(R). The inference-detection and privacy-policy augmentation problem is therefore the problem of controlling the difference $$\delta(C,R)=K(C\cup R)-\{K(C)\cup K(R)\}$$

For example, assume that the collection C is a document which contains the language "Saudi construction magnate from Yemen," but does not contain any explicit words of "Osama Bin Laden." Assume further that R includes all the information publicly available on the Web. Let S denote a privacy policy which is triggered when statement S, "a document pertains to Osama Bin Laden," is true. Since the identity of the person to whom the document pertains is not explicitly disclosed in the document, it is very difficult, if not impossible, to derive statement S from C alone. Therefore, S∉K(C). The statement S is clearly not in K(R) either, since one cannot derive from R alone a statement about a document that is in C but not in R. Hence, S does not belong to K(C)∪K(R). However, as shown earlier, the statement S belongs to K(C∪R). That is, one can learn from C that the document pertains to an individual characterized by the keywords "Saudi," "construction," "magnate," "Yemen," etc. Furthermore, one can learn from R that these keywords are closely associated with "Osama Bin Laden." As illustrated above, by combining these two sources of information, one can learn that the statement S is true with a high probability for document C.

It is critical for a privacy-policy designer to understand $\delta(C,R)$ prior to implementing a privacy policy, to ensure that the documents subject to these privacy policies do not allow for unwanted inferences. A privacy-policy enforcement system may withhold or intercept the communication of the documents based on an assessment of the difference $\delta(C,R)$. Sometimes, a set of sensitive knowledge that should not be leaked, denoted as K*, is explicitly specified. In this case, the privacy-policy augmentation problem becomes the problem of identifying keywords that can be used to screen a document C which causes the intersection $\delta(C,R) \cap K^*$ to be non-empty.

Basic Approach

In the description herein, the collection of training documents C can contain any number of documents known to trigger a privacy policy. In particular, these documents are not restricted to structured data, such as XML-based documents. In one embodiment, an administrator or a user with sufficient privilege to the system can provide this collection of training documents to the system. The training documents may be collected manually, or may be generated by the system from the reference corpus. For instance, the system can issue a query that contains the sensitive subject matter to the Web and collects a number of highest ranked documents as the training documents. Furthermore, collection R is assumed to contain any corpus of documents. In one embodiment, R contains all the information publicly available on the Web. In general, a system that facilitates privacy-policy augmentation based on inference detection performs the following operations. First, the system learns the content of the documents in training documents C. Next, the system determines the inferences that can be drawn from the combination of C and R. The system then associates these inferences with the privacy policy.

In one embodiment, to derive knowledge from training documents in C, the system employs automated content analysis to extract keywords in these documents. The system can use any natural language processing (NLP) tool, ranging from text extraction to in-depth linguistic analysis. In one embodiment, the system selects keywords based on a "term frequency-inverse document frequency" (TF.IDF) analysis. Note that the term "keyword" as used in this disclosure is not limited to a single word, but can include words, phrases, abbreviations, synonyms, or any combination of language symbols.

In a TF.IDF analysis, the system assigns each word in a training document a TF.IDF weight. The system uses this weight, which is a statistical measure, to evaluate how important a word is to a document in a corpus. The importance of a word increases proportionally to the number of times the word appears in the document, but is offset by the frequency of the word occurrence in the corpus. For example, the TF.IDF weight of a term i, denoted as $t_i$, with regard to a given document can be computed as follows:

$$W_{TF.IDF} = \frac{n_i}{\sum_k n_k} \cdot \log \frac{|D|}{|\{d: t_i \in d\}|}.$$

In this formula, term frequency $$\frac{n_i}{\sum_k n_k}$$

is the number of occurrences of $t_i$ in the document, normalized by all the term occurrences in the document. The inverse document frequency, $$\log \frac{|D|}{|\{d: t_i \in d\}|},$$

is a measure of the general importance of the term and is computed as the logarithm of the number of all documents in the corpus divided by the number of documents containing the term $t_i$.

The above formula for computing TF.IDF weight is only one example of TF.IDF definition. For different applications, different TF.IDF definitions can be adopted. In addition, embodiments of the present invention can also use other linguistic analysis approaches to derive knowledge from a document.

Next, to determine inferences that can be drawn from the combination of C and R, the system issues search queries for documents that match subsets of the keywords previously extracted. The system issues these queries within a reference corpus R, such as the public Web or a collection of internal documents. The system then analyzes the documents returned by the search queries (i.e., "hits") for keywords not present in the original training document(s). Based on these additional keywords, the system can automatically estimate the likelihood of certain inferences that can be derived by keywords extracted from the training document(s). In one embodiment, potentially dangerous inferences are flagged for manual review. The system then associates the keywords that cause undesired inferences to the privacy policy, thereby allowing the privacy-policy enforcement to be more accurate and robust.

FIG. 1 illustrates an exemplary block diagram for a system that augments privacy policies in accordance with an embodiment of the present invention. The system first receives a privacy policy 100 and a set of known sensitive documents 102, which are considered as training documents that are expected to trigger privacy policy 100. In one embodiment, the system applies an NLP analysis 104 to training documents 102. In response, the system obtains a set of knowledge representation 106 for private documents 102. In one embodiment, the system performs a TF.IDF analysis to training documents 102 and obtains a pre-determined number of the highest-ranking keywords 106.

Based on the extracted keywords 106, the system formulates a number of queries 110, and issues these queries to a search engine 112. Search engine 112 conducts the corresponding searches on a set of reference documents (corpus) 108. Note that although in one embodiment corpus 108 includes all the public information on the Web, corpus 108 can also include other format of media. For example, corpus 108 can be all the public court documents, medical records, or all the books in a library. Corpus 108 can also include a collection of internal documents that are not publicly available.

Search engine 112 then returns a number of hits 114. The system performs hit analysis 116 and compares the analysis result with a set of seed keywords 106. In one embodiment, the system performs TF.IDF analysis to each returned hit document of a pre-determined number of highest ranked hits and extracts a pre-determined number of highest ranked keywords for each analyzed hit document. The system then compares each keyword in a hit document with seed keywords 106, and flag the hit document which results in a match. When there is a match, the system flags the corresponding keyword in keywords 106 as a sensitive word. By doing so for all the keywords 106, the system can identify a number of sensitive words 108 which can be associated with privacy policy 100.

Privacy-Policy Augmentation Based on Inference Detection

The privacy-policy augmentation system described herein illustrates only one embodiment of the present invention. A wide range of NLP tools can be incorporated into the general privacy-policy augmentation model and achieve substantially similar results. The following section describes the inputs, outputs, and parameters of a generic inference-detection model for purposes of privacy-policy augmentation.

Inputs: A collection of training documents $C=\{C_1, \ldots, C_n\}$, a collection of reference documents R, and a list of seed keywords K* that represents sensitive knowledge.

Output: A list L of sensitive words that can be drawn from the union of C and R. A respective sensitive word corresponds to an inference that can be derived from at least one seed keyword. Note that the output of the system can be a list of sensitive words that can be used to augment the privacy policy in identifying documents containing the sensitive information. The system returns an empty list if it fails to detect any sensitive inference.

Parameters: This privacy-policy augmentation model is parameterized by four parameters. Parameter $\alpha$ controls the depth of the NLP analysis of the documents in C. Parameters $\beta$ and $\gamma$ control the search depth for documents in R that are related to C. Parameter $\delta$ controls the depth of the NLP analysis of the documents retrieved by the search engine, i.e., the hit documents. In one embodiment, the values of $\alpha$, $\beta$, $\gamma$, and $\delta$ are all positive integers. These parameters can be tuned to achieve different trade-offs between the running time of the model and the completeness and quality of inference detection.

The system implements and executes the privacy-policy augmentation model in the following stages.

Understanding the documents in training documents C. The system performs a TF.IDF analysis to extract, from each document $C_i$ in the collection C, the top $\alpha$ keywords that are most representative of $C_i$. Let $S_i$ denote the set of the top $\alpha$ keywords extracted from document $C_i$.

Inference detection. The list L of sensitive words is initially empty. The system considers in turn every subset $C' \subset C$ of size $|C'| \leq \beta$. For every such subset $C'=(C_{i1}, \ldots, C_{ik})$, with $k \leq \beta$, the system performs the following operations. For every vector of keywords $(W_{i1}, \ldots, W_{ik})$ in the Cartesian product $S_{i1} \times \ldots \times S_{ik}$:

1. The system uses a search engine to retrieve from the collection R of reference documents the top $\gamma$ documents that contain all the keywords $(W_{i1}, \ldots, W_{ik})$.
2. With the TF.IDF analysis, the system extracts the top $\delta$ keywords from this collection of $\gamma$ documents. In one embodiment, these keywords are extracted from the aggregate collection of $\gamma$ documents as if all these documents were concatenated into a single large document, not from each individual document.
3. Let W* denote the intersection of the $\delta$ keywords obtained from operation 2 with the set K* of seed keywords. If W* is non-empty, the system adds keyword vector $(W_{i1}, \ldots, W_{ik})$ to L. The system then outputs the list L and exits.

The system can further use additional queries to gauge, or rank, the strength of the inference between an identified candidate keyword(s) in the training documents and a seed keyword, after obtaining the list L. In one embodiment, the system computes a sensitive-hits ratio, which in one embodiment is defined as the number of the search hits from a query containing both the candidate keyword(s) and the seed keyword, to the number of search hits from a query containing only the candidate keyword(s). The system then ranks the keywords in the training documents according to the strength of their inferences. For example, to evaluate the likelihood the term "naltrexone" can be used to infer "alcoholic," the system can issue a first query for "naltrexone," retrieving x documents, and a second query for "naltrexone alcoholism," retrieving y documents. The system can then calculate the ratio y/x. If this ratio is fairly close to 1, one might decide that naltrexone should be associated with a privacy policy designed to screen all documents related to alcoholism.

Note that the system can also use the aforementioned sensitive-hits ratio computation method as the main approach, instead of an add-on, to identify inferences. In one embodiment, the system first extracts the keywords from a set of training documents using NLP tools. For each keyword extracted from the training documents, the system then computes the sensitive-hits ratio for each extracted keyword with respect to each seed keyword. If the sensitive-hits ratio between an extracted keyword and a seed keyword is greater than a given threshold, the system identifies the extracted keyword as a sensitive word to be associated with a corresponding privacy policy. Furthermore, the system can also receive a set of seed keywords or key-phrases and the extracted keyword can include one or more multi-word phrases. For example, the system can extract three phrases, "blood shot eyes," "memory loss," and "liver disease," and compute a sensitive-hits ratio for sensitive words associated with alcoholism, such as "alcoholism," "alcohol," "alcoholic," "drunk," "drinking." To compute the sensitive-hits ratio, the system first issues a query for "blood shot eyes memory loss liver disease," and then a query for "blood shot eyes memory loss liver disease AND (alcoholism OR alcohol OR alcoholic OR drunk OR drinking)." The system then computes the ratio between the number of hits returned by the second query to the number of hits returned by the first query. In general, the system can combine any number of extracted words or phrases in generating the queries.

The aforementioned privacy-policy augmentation model can be tailored to a variety of applications.

In some embodiments, the system can employ any given logic relationship when formulating queries based on a number of keywords. Although the examples described herein are based on queries containing space-separated keywords, the system can adopt any Boolean-formulated queries. For example the system can insert "AND" or "OR" between the keywords. With some advanced search engines, the system can also specify how the keywords should appear in the document, such as within a certain number of paragraphs, sentences, or words. Furthermore, the system can also analyze the keywords and formulate the queries based on the analysis. For example, if the system determines that two keywords are synonyms or closely related, the system can optionally insert an "OR" between the keywords when formulating a query.

In further embodiments, the system can intelligently select different corpora according to the documents under test. The system can also select corpora based on the intended audience.

The aforementioned model assumes that the sensitive knowledge K* is given as a set of seed keywords. Other representations of sensitive knowledge are also possible. In one embodiment, sensitive knowledge may be based on a topic which may include only one word, such as alcoholism or sexually transmitted diseases, instead of a list of seed keywords. To handle this case, the system performs a preprocessing operation which converts a sensitive topic into a list of seed keywords. One way of doing so is to issue a search query for documents in the reference collection R that contain the sensitive topic, and use TF.IDF analysis to extract from these documents an expanded set of seed keywords for the sensitive topic.

Figure 2:
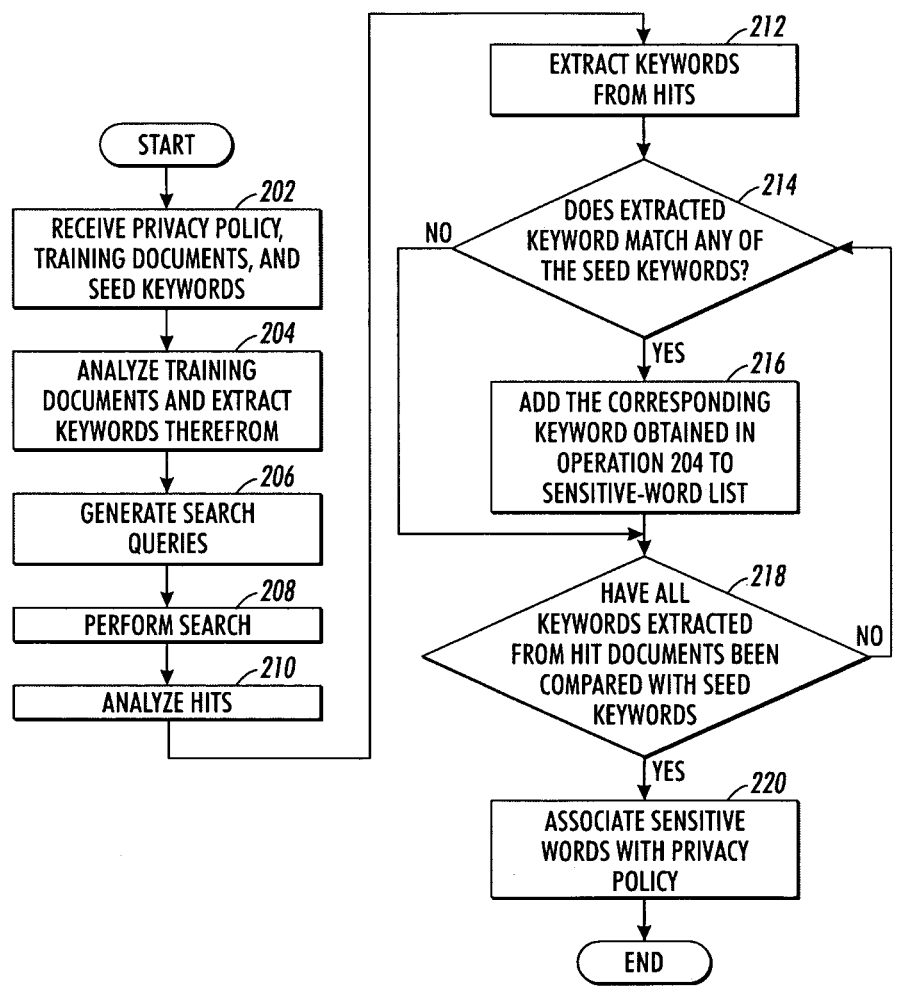
FIG. 2 presents an exemplary flow chart illustrating the process of augmenting a privacy policy in accordance with an embodiment of the present invention.

FIG. 2 presents an exemplary flow chart illustrating the process of augmenting a privacy policy in accordance with an embodiment of the present invention. During operation, the system receives a privacy policy, a set of training documents, and a set of seed keywords (operation 202). The system analyzes these training documents to extract the keywords (operation 204) and generates the corresponding search queries (operation 206). A search engine then performs searches on the Web (or another type of corpus) based on these queries and returns a number of hits (operation 208).

Subsequently, the system analyzes the hits returned by the search engine using NLP techniques (operation 210) and extracts keywords from these hits (operation 212). The system then determines whether a keyword extracted from the hits matches any of the seed keywords (operation 214). If so, the system adds the corresponding keyword obtained in operation 204 to the sensitive-word list (operation 216). Otherwise, the system proceeds to determine whether all keywords extracted from the hits have been compared with the seed keywords (operation 218). If not, the system reverts to operation 214. Otherwise, the system returns the list of sensitive words and associates these sensitive words with the privacy policy (operation 220).

Figure 3:
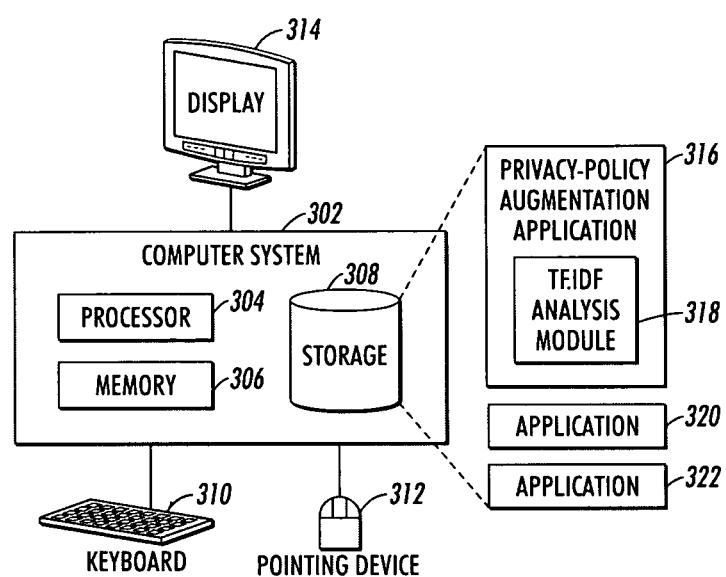
FIG. 3 illustrates a computer system for augmenting and enforcing privacy policies in accordance with one embodiment of the present invention.

FIG. 3 illustrates a computer system for augmenting and enforcing privacy policies in accordance with one embodiment of the present invention. A computer system 302 includes a processor 304, a memory 306, and a storage device 308. Computer system 302 is also coupled to a display 314, a keyboard 310, and a pointing device 312. Storage device 308 stores a privacy-policy augmentation application 316, and applications 320 and 322. In addition, privacy-policy augmentation application 316 contains a TF.IDF analysis module 318, which performs keyword extraction from documents during the privacy-policy augmentation process. During operation, privacy-policy augmentation application 316 is loaded into memory 306 and executed by processor 304. Note that computer system 302 can be coupled to the Internet, whereby the Web searches are performed by a separate search engine.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for augmenting a privacy policy, the method comprising:
    obtaining a set of training documents and a seed keyword associated with the privacy policy;
    extracting a candidate keyword from the training documents;
    issuing at least one query comprising the candidate keyword to a corpus;
    receiving a set of result documents;
    evaluating an inference strength between the candidate keyword and a respective seed keyword, wherein evaluating the inference strength comprises evaluating a ratio between the number of search hits from a query containing both the candidate keyword and the respective seed keyword, and the number of search hits from a query containing only the candidate keyword;
    determining that the evaluated inference strength is greater than a predetermined threshold ratio;
    responsive to the evaluated inference strength being greater than the predetermined threshold ratio, augmenting the privacy policy by associating the candidate keyword with the privacy policy; and
    applying the augmented privacy policy to a subject document to determine whether the subject document triggers the privacy policy, wherein applying the augmented privacy policy comprises searching the subject document for occurrences of any of the candidate keywords associated with the augmented privacy policy.

2. The method of claim 1, further comprising extracting the keywords from the result documents by determining a term-frequency inverse-document-frequency (TF.IDF) weight for a respective word or phrase contained in a respective result document.

3. The method of claim 1, wherein obtaining the seed keywords comprises issuing a query based on a sensitive topic to the corpus and extracting the seed keywords from a number of documents returned in response to the query.

4. The method of claim 1, wherein obtaining the training documents comprises issuing a query based on a sensitive topic to the corpus and retrieving a predetermined number of highest ranked documents returned in response to the query.

5. The method of claim 1, wherein obtaining the set of training documents comprises receiving one or more documents that are known to pertain to sensitive subject matter.

6. The method of claim 1, wherein obtaining the set of training documents comprises:
    issuing an initial query to a corpus, wherein the initial query includes the seed keyword associated with the privacy policy; and
    selecting a predetermined number of top-ranking search results of the initial query.

7. A computer system for augmenting a privacy policy, the computer system comprising:
    a processor;
    a memory coupled to the processor;
    a training-document obtaining mechanism configured to obtain a set of training documents associated with the privacy policy;
    a seed-keyword obtaining mechanism configured to obtain a seed keyword associated with the privacy policy;
    a keyword-extraction mechanism configured to extract a candidate keyword from the training documents;
    a query-issuing mechanism configured to issue at least one query comprising the candidate keywords to a corpus;
    a result-receiving mechanism configured to receive a set of result documents;
    an evaluation mechanism configured to evaluate an inference strength between a candidate keyword and a respective seed keyword, wherein evaluating the inference strength comprises evaluating a ratio between the number of search hits from a query containing both the candidate keyword and the respective seed keyword, and the number of search hits from a query containing only the candidate keyword;
    a comparison mechanism configured to determine that the evaluated inference strength is greater than a predetermined threshold ratio
    a privacy-policy augmentation mechanism configured to augment the privacy policy by associating the candidate keyword with the privacy policy, responsive to the evaluated inference strength being greater than the predetermined threshold ratio; and a privacy-policy enforcement mechanism configured to apply the augmented privacy policy to a subject document, wherein applying the augmented privacy policy comprises searching the subject document for occurrences of any of the candidate keywords associated with the augmented privacy policy.

8. The computer system of claim 7, wherein the keyword-extraction mechanism is further configured to extract the keywords from the result documents by determining a term-frequency inverse-document-frequency (TF.IDF) weight for a respective word or phrase contained in a respective result document.

9. The computer system of claim 7, wherein while obtaining the seed keywords, the seed-keyword obtaining mechanism is further configured to issue a query based on a sensitive topic to the corpus and extract the seed keywords from a number of documents returned in response to the query.

10. The computer system of claim 7, wherein while obtaining the training documents, the training-document obtaining mechanism is further configured to issue a query based on a sensitive topic to the corpus and retrieve a predetermined number of highest ranked documents returned in response to the query.

11. The computer system of claim 7, wherein while obtaining the set of training documents, the training-document obtaining mechanism is further configured to receive one or more documents that are known to pertain to sensitive subject matter.

12. The computer system of claim 7, wherein while obtaining the set of training documents, the training-document obtaining mechanism is further configured to:
 issue an initial query to a corpus, wherein the initial query includes the seed keyword associated with the privacy policy; and
 select a predetermined number of top-ranking search results of the initial query.

13. A non-transitory computer-readable medium storing instructions which when executed by a computer cause the computer to perform a method for augmenting a privacy policy, the method comprising:
 obtaining a set of training documents and a seed keyword associated with the privacy policy;
 extracting a candidate keyword from the training documents;
 issuing at least one query comprising the candidate keyword to a corpus;
 receiving a set of result documents;
 evaluating an inference strength between the candidate keyword and a respective seed keyword, wherein evaluating the inference strength comprises evaluating a ratio between the number of search hits from a query containing both the candidate keyword and the respective seed keyword, and the number of search hits from a query containing only the candidate keyword;
 determining that the evaluated inference strength is greater than a predetermined threshold ratio;
 responsive to the evaluated inference strength being greater than the predetermined threshold ratio, augmenting the privacy policy by associating the candidate keyword with the privacy policy; and
 applying the augmented privacy policy to a subject document to determine whether the subject document triggers the privacy policy, wherein applying the augmented privacy policy comprises searching the subject document for occurrences of any of the candidate keywords associated with the augmented privacy policy.

14. The computer-readable medium of claim 13, further comprising extracting the keywords from the result documents by determining a term-frequency inverse-document-frequency (TF.IDF) weight for a respective word or phrase contained in a respective result document.

15. The computer-readable medium of claim 13, wherein obtaining the seed keywords comprises issuing a query based on a sensitive topic to the corpus and extracting the seed keywords from a number of documents returned in response to the query.

16. The computer-readable medium of claim 13, wherein obtaining the training documents comprises issuing a query based on a sensitive topic to the corpus and retrieving a predetermined number of highest ranked documents returned in response to the query.

17. The computer-readable medium of claim 13, wherein obtaining the set of training documents comprises receiving one or more documents that are known to pertain to sensitive subject matter.

18. The computer-readable medium of claim 13, wherein obtaining the set of training documents comprises:
 issuing an initial query to a corpus, wherein the initial query includes the seed keyword associated with the privacy policy; and
 selecting a predetermined number of top-ranking search results of the initial query.

\* \* \* \* \*